(12) United States Patent
Elberse et al.

(10) Patent No.: US 8,756,326 B1
(45) Date of Patent: Jun. 17, 2014

(54) USING INTERACTIVE COMMUNICATION SESSION COOKIES IN WEB SESSIONS

(75) Inventors: Arik Elberse, Knocknacarra (IE); John H. Yoakum, Cary, NC (US)

(73) Assignee: Rockstar Consortium US LP, Plano, TX (US)

( * ) Notice: Subject to any disclaimer, the term of this patent is extended or adjusted under 35 U.S.C. 154(b) by 833 days.

(21) Appl. No.: 11/268,845

(22) Filed: Nov. 8, 2005

(51) Int. Cl.
| | | |
|---|---|---|
| G06F 15/16 | (2006.01) | |
| G06F 15/173 | (2006.01) | |
| H04L 29/08 | (2006.01) | |
| H04L 29/06 | (2006.01) | |
| H04W 88/02 | (2009.01) | |
| H04M 7/00 | (2006.01) | |

(52) U.S. Cl.
CPC .............. *H04L 67/02* (2013.01); *H04L 67/14* (2013.01); *H04L 29/06* (2013.01); *H04L 29/06176* (2013.01); *H04L 29/06387* (2013.01); *H04L 69/329* (2013.01); *H04L 67/42* (2013.01); *H04L 65/1006* (2013.01); *H04W 88/02* (2013.01); *H04M 7/0003* (2013.01)
USPC .......................... 709/227; 709/219; 709/224

(58) Field of Classification Search
CPC ... H04L 67/02; H04L 67/14; H04L 29/06176; H04L 29/06387; H04L 67/42; H04L 65/1006
USPC .......... 709/206, 203, 227, 217, 219, 223, 224
See application file for complete search history.

(56) References Cited

U.S. PATENT DOCUMENTS

| | | | | |
|---|---|---|---|---|
| 5,835,724 | A * | 11/1998 | Smith | ........................... 709/227 |
| 5,961,601 | A | 10/1999 | Iyengar | |
| 6,256,739 | B1 | 7/2001 | Skopp et al. | |
| 6,337,858 | B1 | 1/2002 | Petty et al. | |
| 6,778,653 | B1 * | 8/2004 | Kallas et al. | ............. 379/201.02 |
| 6,871,213 | B1 | 3/2005 | Graham et al. | |
| 6,965,870 | B1 | 11/2005 | Petras et al. | |
| 7,171,478 | B2 | 1/2007 | Lueckhoff et al. | |
| 7,188,140 | B1 | 3/2007 | Greenspan et al. | |

(Continued)

FOREIGN PATENT DOCUMENTS

GB      2 364 408 A      1/2002

OTHER PUBLICATIONS

International Search Report for PCT/IB2006/002505, mailed Mar. 7, 2007.

(Continued)

*Primary Examiner* — Viet Vu
*Assistant Examiner* — Herman Belcher
(74) *Attorney, Agent, or Firm* — Withrow & Terranova, PLLC

(57) ABSTRACT

In one embodiment of the present invention, a web cookie or information provided in a web cookie is accessed by a first communication client and forwarded to a second communication client during an interactive communication session (ICS). The second communication client can use the web cookie or information provided in the web cookie to operate in a defined manner. The operation may include accessing the web server that originally created and provided the web cookie to a web browser associated with the first communication client to obtain information related to a web session. This information related to the web session can be used to provide customized operation during the interactive communication session based on the prior web session. In another embodiment, an interactive communication session cookie or information in the ICS cookie can be retrieved by an associated web browser and forwarded to a web server during a web session.

9 Claims, 7 Drawing Sheets

(56) References Cited

U.S. PATENT DOCUMENTS

| | | | |
|---|---|---|---|
| 7,188,183 | B1 | 3/2007 | Paul et al. |
| 7,747,761 | B2 * | 6/2010 | Wengrovitz ............... 709/228 |
| 2002/0073150 | A1 * | 6/2002 | Wilcock .................. 709/204 |
| 2002/0083179 | A1 | 6/2002 | Shaw et al. |
| 2003/0009562 | A1 * | 1/2003 | Heymann et al. ........... 709/227 |
| 2003/0014526 | A1 | 1/2003 | Pullara et al. |
| 2003/0035532 | A1 | 2/2003 | Ganesan et al. |
| 2003/0061275 | A1 * | 3/2003 | Brown et al. .............. 709/203 |
| 2003/0110266 | A1 * | 6/2003 | Rollins et al. ............. 709/227 |
| 2003/0154289 | A1 * | 8/2003 | Williamson et al. ......... 709/227 |
| 2003/0154398 | A1 * | 8/2003 | Eaton et al. ............... 713/201 |
| 2003/0162561 | A1 | 8/2003 | Johnson et al. |
| 2004/0015546 | A1 * | 1/2004 | Cotte ..................... 709/204 |
| 2004/0037401 | A1 * | 2/2004 | Dow et al. ................ 379/88.18 |
| 2004/0049673 | A1 | 3/2004 | Song et al. |
| 2004/0068572 | A1 | 4/2004 | Wu |
| 2004/0080771 | A1 * | 4/2004 | Mihira et al. .............. 358/1.13 |
| 2004/0083292 | A1 | 4/2004 | Lueckhoff et al. |
| 2004/0103197 | A1 | 5/2004 | Benson |
| 2005/0050204 | A1 * | 3/2005 | Beck et al. ............... 709/227 |
| 2005/0066037 | A1 * | 3/2005 | Song et al. ............... 709/227 |
| 2005/0086344 | A1 * | 4/2005 | Suesserman ............... 709/227 |
| 2006/0015575 | A1 | 1/2006 | Parnes et al. |
| 2006/0075122 | A1 | 4/2006 | Lindskog et al. |
| 2006/0282538 | A1 | 12/2006 | Anglin et al. |
| 2008/0154933 | A1 * | 6/2008 | Galvin et al. .............. 707/102 |

OTHER PUBLICATIONS

Examiner's Answer to Appeal Brief for U.S. Appl. No. 11/268,887 mailed Oct. 31, 2011, 19 pages.
Final Office Action for U.S. Appl. No. 11/268,887 mailed Jan. 20, 2011, 20 pages.
Non-final Office Action for U.S. Appl. No. 11/268,887 mailed Jun. 18, 2010, 21 pages.
Examiner's Answer to Appeal Brief for U.S. Appl. No. 11/269,219 mailed Nov. 16, 2010, 17 pages.
Final Office Action for U.S. Appl. No. 11/269,219 mailed May 11, 2010, 14 pages.
Decision on Appeal for U.S. Appl. No. 11/269,219, mailed Dec. 18, 2013, 10 pages.
Non-Final Office Action for U.S. Appl. No. 11/269,219, mailed Mar. 6, 2014, 14 pages.

* cited by examiner

USING INTERACTIVE COMMUNICATION SESSION COOKIES IN WEB SESSIONS

CROSS-REFERENCE TO RELATED APPLICATIONS

This application is related to U.S. patent application Ser. No. 11/269,219, filed on Nov. 8, 2005, entitled INTERACTIVE COMMUNICATION SESSION COOKIES, and U.S. patent application Ser. No. 11/268,887, filed on Nov. 8, 2005, entitled USING COOKIES WITH INTERACTIVE COMMUNICATION SESSIONS AND WEB SESSIONS, the disclosures of which are incorporated herein by reference in their entireties.

FIELD OF THE INVENTION

The present invention relates to interactive communication sessions, and in particular to using cookies in association with interactive communication sessions.

BACKGROUND OF THE INVENTION

Packet-based networks have evolved to a point where interactive communication sessions are commonplace. These interactive communication sessions may support interactive media of any type including audio, video, voice and real-time data sessions. Further, different interactive communication sessions may be associated with one another at any given time. As such, packet-based networks are capable of providing sophisticated communications that were at best impractical in the traditional public switched telephone network. The sophistication of the communications has led to the development of sophisticated communication clients, which are capable of implementing a variety of user preferences and communication functions.

Unfortunately, selecting or implementing the various desired functions for each interactive communication session is cumbersome. In many instances, consecutive interactive communication sessions between the same or related communication clients benefit from or require the same functions to be implemented by the communication clients. For example, each interactive communication session may require a certain type of encryption, or select communication terminals may require the implementation of certain user preferences. In many instances, criteria used to control a subsequent interactive session or a communication client during the subsequent interactive communication session should be the same as the criteria established during a prior interactive communication session.

Accordingly, there is a need for a technique to share information related to a prior interactive communication sessions among communication terminals and allow the communication terminals to use the information in association with subsequent communication sessions in an efficient and effective manner.

SUMMARY OF THE INVENTION

In one embodiment of the present invention, a web cookie or information provided in a web cookie is accessed by a first communication client and forwarded to a second communication client during an interactive communication session (ICS). The second communication client can then use the web cookie or information provided in the web cookie to operate in a defined manner. The operation may include accessing the web server that originally created and provided the web cookie to the web browser associated with the first communication client to obtain information related to a web session. This information related to a web session can be used to provide customized operation during the interactive communication session based on the prior web session. In another embodiment, an interactive communication session cookie or information in the ICS cookie can be retrieved by an associated web browser and forwarded to a web server during a web session. Accordingly, information associated with the interactive communication session, the parties thereto, or information being transferred within the interactive communication session can be used by the web server to enhance the web session. In particular, any web pages provided in response to an appropriate request may be specially configured or selected based at least in part on the ICS cookie or the information provided therein.

The ICS cookie may include or be associated with persistent session information, which is any type of information relating to a prior interactive communication session and useful during another interactive communication session or related web session. The persistent session information may identify aspects of the actual interactive communication session or sessions, the participating communication clients, or information shared during one or more interactive communication sessions. For example, the persistent session information may allow the second communication client to recognize that a subsequent interactive communication session is related to a first communication session, or that the subsequent interactive communication session involves a party to a prior interactive communication session. Based on this information, the second communication client may provide any number of functions, including controlling the current interactive communication session in any number of predefined ways.

In other embodiments, a proxy or other entity operating on behalf of the first communication client or group of communication clients may actually receive and store the ICS cookie. Upon assisting in establishing another interactive communication session with the second communication client, the proxy may return the ICS cookie to the second communication client, such that the customized operation in light of the ICS cookie can take place.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a communication environment according to one embodiment of the present invention.

FIGS. 2A and 2B provide a communication flow diagram illustrating the transfer and use of interactive communication session cookies according to one embodiment of the present invention.

FIG. 3 provides a communication flow diagram illustrating the transfer and use of interactive communication session cookies according to a second embodiment of the present invention.

DETAILED DESCRIPTION OF THE PREFERRED EMBODIMENTS

Figure 1:
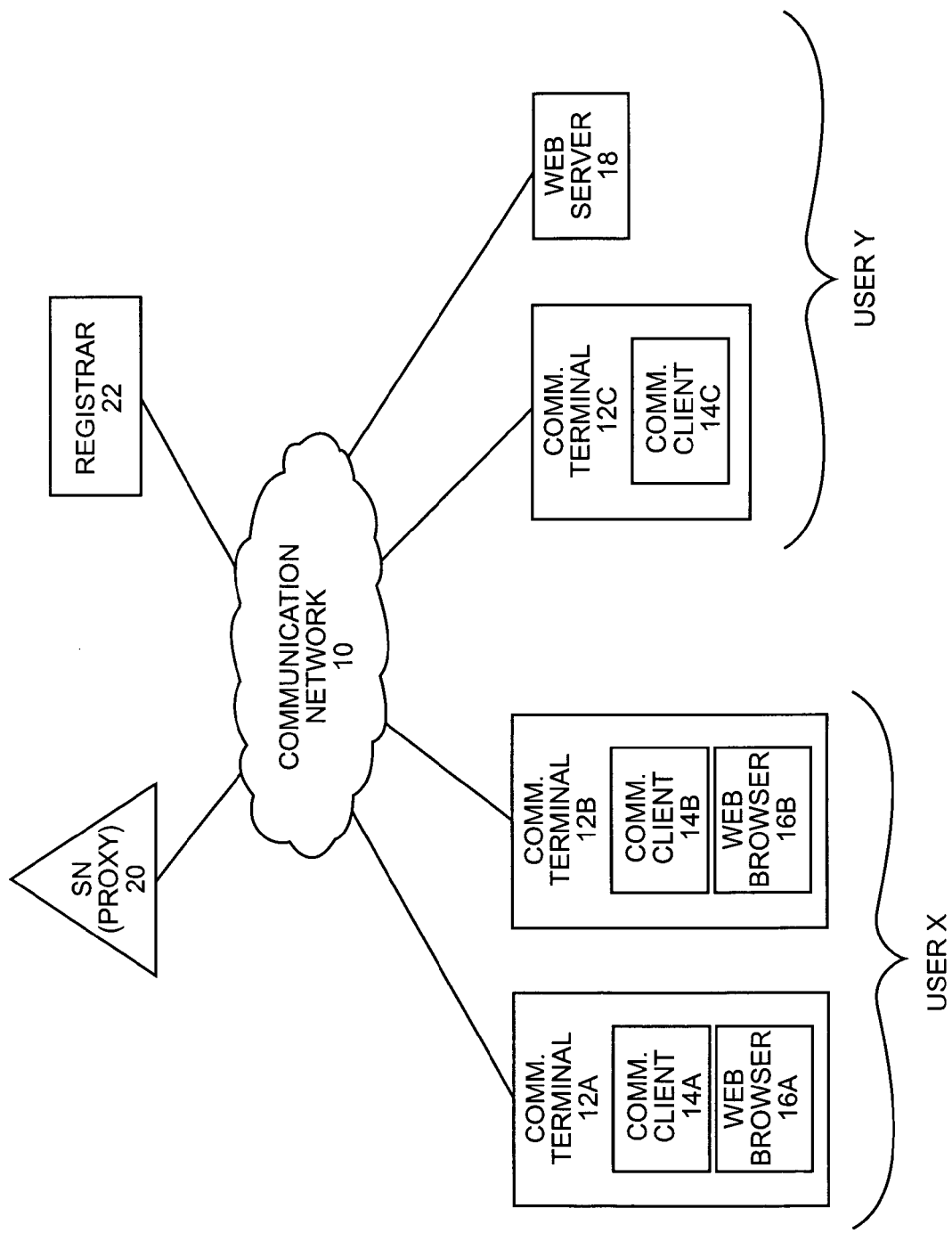

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

An interactive communication session (ICS) is an active communication session between two or more communication clients. Interactive communications sessions may involve any media including audio, video, or voice communications as well as data transfer. An interactive communication session is not a web browser and server interaction where the web browser requests web pages from the server in traditional fashion.

An ICS cookie is a data structure for storing and sharing persistent session information. The persistent session information is any type of information that relates to a prior ICS and is useful during a subsequent ICS. In particular, the persistent session information may identify aspects of the actual interactive communication session, the participating communication clients, or information shared during one or more interactive communication sessions.

In general, an ICS cookie is received and stored by a first communication client or supporting proxy in association with the prior ICS and is subsequently passed to a second communication client in association with a subsequent ICS. The second communication client will operate to control the second interactive communication session or provide select functions in light of the persistent session information. Initially, the ICS cookie can be created by the second communication client or an associated client and delivered to the first communication client or supporting proxy in association with the first ICS. An ICS cookie is not a web cookie, which is provided to a web browser from a web server. The ICS cookie can be stored at a location other than the communication client.

The information in an ICS cookie may include the actual persistent session information, information from which the persistent session information can be derived, or information used to access the persistent session information. The time during which the persistent session information is to be persisted may be temporary or permanent with the persistence duration specified by the communication client that generated the ICS cookie. When not specifically provided in the ICS cookie, the persistent session information is stored in a location readily accessible by the second communication client based on the information provided in the ICS cookie. The persistent session information is generally referred to as ICS cookie information. The ICS cookie may provide an association between two communicating entities, wherein each entity may be a single user or a group of associated users. Each entity may be identified using one or more user identifications at a particular domain.

Accordingly, the ICS cookie can be retrieved from the first communication client or supporting proxy by the second communication client, which can operate in a more effective and informed manner based on the persistent session information. The ICS cookies can be shared among associated communication clients or supporting proxies as well as be retrieved by associated communication clients. Prior to delving into the details of the present invention, an overview of a communication environment capable of supporting ICS cookies is provided.

With reference to FIG. 1, a communication environment is illustrated according to one embodiment of the present invention. The communication environment is centered about a communication network 10, which may be made up of in whole or in part a web of packet-based communication networks. The communication network 10 supports packet-based communications between various communication terminals 12, including communication terminals 12A-12C. Communication terminals 12A and 12B are illustrated as including communication clients 14A and 14B, respectively, as well as web browsers 16A and 16B, respectively. Communication clients 14A and 14B are configured to support interactive communication sessions with other communication clients. Web browsers 16A and 16B are configured to support traditional browser functionality, such as requesting web pages from any number of web servers, including the illustrated web server 18, which will respond by providing the appropriate web pages to the web browsers 16A or 16B. For the purposes of the following discussion, assume that communication terminals 12A and 12B are associated with User X, and communication terminal 12C and web server 18 are associated with User Y. Communication terminal 12C may include a communication client 14C, which is capable of supporting interactive communication sessions with communication clients, including either of communication clients 14A or 14B of the communication terminals 12A or 12B, respectively. Notably, User X or User Y may be an individual or group of individuals.

A service node (SN) 20 may be provided to facilitate the establishment and control of the interactive communication sessions on behalf of the communication clients 14A and 14B. In a Session Initiation Protocol (SIP) environment, the service node 20 may act as a proxy on behalf of communication clients 14A and 14B, which are associated with communication terminals 12A and 12B of User X. A registrar 22 may be provided to control access to the communication network 10. For example, the various communication clients 14A and 14B may need to register with the registrar 22 prior to initiating or terminating interactive communication sessions. The registration process may include various verification or authentication processes, which are known to those skilled in the art.

Figure 2A:
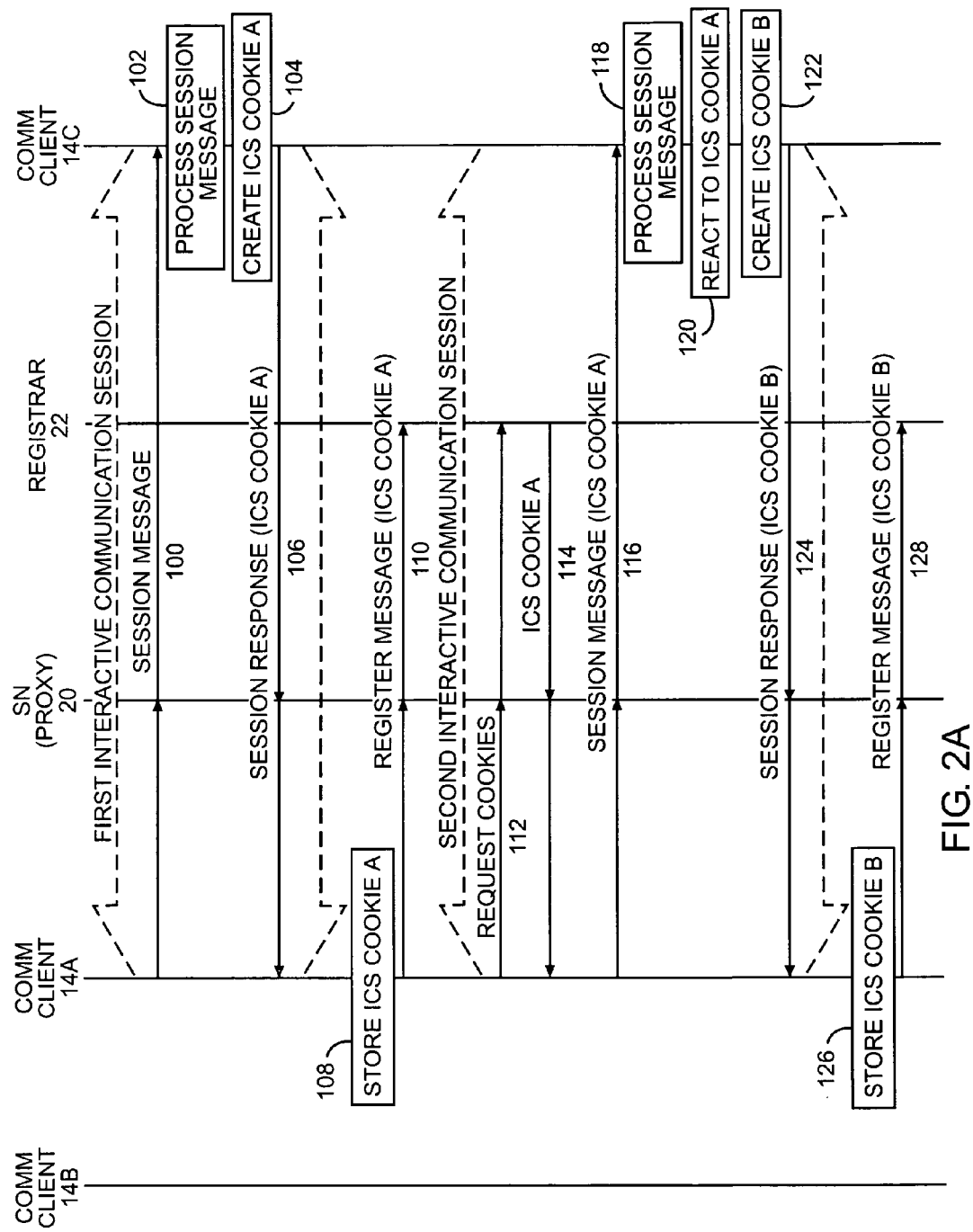
Figure 2B:
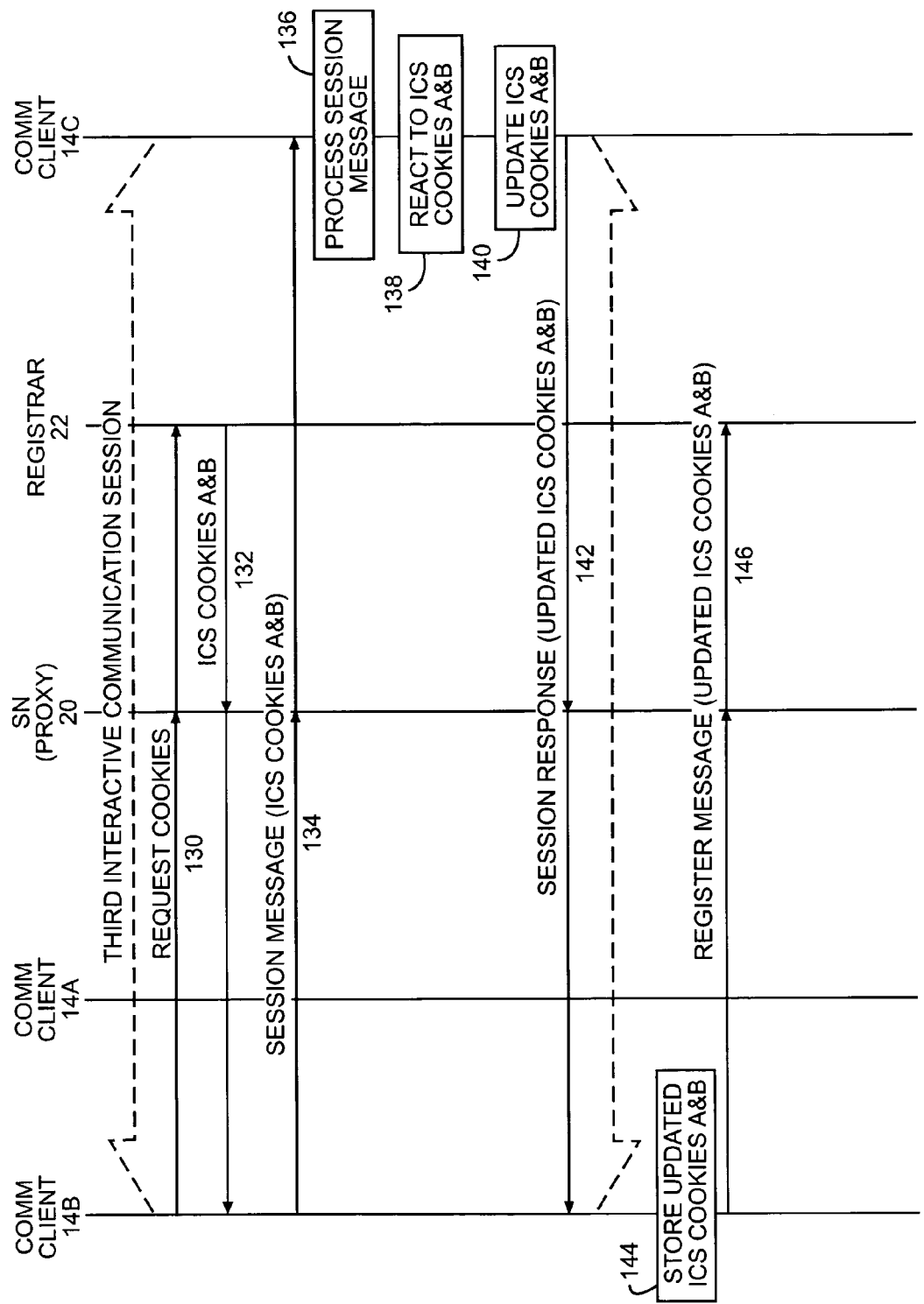

Turning now to FIGS. 2A and 2B, a communication flow diagram is provided to illustrate how an ICS cookie can be generated in association with a first interactive communication session by communication client 14C and provided to communication client 14A, which will return the ICS cookie to communication client 14C in association with a second interactive communication session. Communication client 14C can use the ICS cookie returned in association with the subsequent (second) interactive communication session to control an aspect of the second interactive communication session or some other function provided by the communication client 14C. The communication flow diagram of FIGS. 2A and 2B also shows how the ICS cookie can be made available to communication client 14B.

In association with a first interactive communication session, a Session Message is sent from communication client 14A to communication client 14C directly or through the service node 20, which acts as a proxy for communication clients 14A and 14B (step 100). The Session Message may be an initiation message, an information message, or any other message occurring before, during, or after the first interactive communication session, but associated with the first interactive communication session. Communication client 14C will receive the Session Message and process the Session Message as necessary (step 102). Communication client 14C may create ICS Cookie A (step 104) based on some aspect of the first interactive communication session, communication client 14A, the user associated with communication client 14A, some aspect associated with communication client 14C, or communication terminal 12C. ICS Cookie A may be automatically created without the knowledge of User X, or communication client 14C may query User X as to whether and how ICS Cookie A should be created. ICS Cookie A may be created to take on different forms or have different meanings based on any type of criteria, including direct input from User Y. Alternatively, communication client 14C may interact with an external entity (not shown), such as a business application, to determine how to create ICS Cookie A. Once ICS Cookie A is created, communication client 14C may send ICS Cookie A to communication client 14A in a Session Response message sent in response to the original Session Message (step 106) or in an independent Session Message, such as a SIP Notify message. Communication client 14A will store ICS Cookie A (step 108) on either a permanent or temporary basis. Whether on a permanent or temporary basis, communication client 14A may send ICS Cookie A to the registrar 22 in a Register Message (step 110) to enable ICS cookies to be shared between associated communication clients.

At a subsequent time, either during or after the first interactive communication session, a second interactive communication session between communication clients 14A and 14C is established. Communication client 14A will check for any cookies associated with an interactive communication session related to communication client 14C, User Y, or a group associated with communication client 14C or User Y. Communication client 14A may check its internal memory or access the registrar 22 by sending a Request for relevant cookies (step 112) and receiving any cookies, in this case, ICS Cookie A, from the registrar 22 (step 114). Communication client 14A will then send ICS Cookie A to communication client 14C in a Session Message associated with the second interactive communication session (step 116). Communication client 14C will process the Session Message (step 118) in traditional fashion, as well as recovering and reacting to ICS Cookie A (step 120). Reaction to ICS Cookie A will generally trigger an action by communication client 14C to either control itself to provide a select function, or control the second interactive communication session in a desired manner. Examples of the various ways in which the second interactive communication session may be controlled and the functions that may be provided by communication client 14C are described further below.

Communication client 14C may create an additional ICS Cookie B based on the second interactive communication session as well as perhaps the first interactive communication session (step 122). ICS Cookie B may be sent to communication client 14A in a Session Response message (step 124). As with ICS Cookie A, ICS Cookie B may be stored permanently or temporarily in communication client 14A (step 126), as well as being sent to the registrar 22 in a Register message (step 128). Likewise, communication client 14C may generate an update to the original ICS cookie, ICS Cookie A, and communicate the update back to communication client 14A in a similar fashion.

At this point, assume a third interactive communication session is established between communication client 14B and communication client 14C. Such a scenario may occur when User X changes from using communication terminal 12A to using communication terminal 12B. Communication client 14B will attempt to obtain any pertinent cookies from its internal memory, and if necessary from the registrar 22 by sending a Request for cookies associated with an interactive communication session with communication client 14C or an affiliated entity or user (step 130). The registrar 22 will return any pertinent cookies (step 132). In this instance, assume that ICS Cookies A and B are applicable for any interactive communication sessions established by either communication client 14A or communication client 14B with communication client 14C. As such, communication client 14B will access ICS Cookies A and B and send ICS Cookies A and B to communication client 14C in a Session Message (step 134). Communication client 14C will process the Session Message (step 136) in traditional fashion, as well as recovering and reacting to ICS Cookies A and B to control the third interactive communication session or provide an appropriate function (step 138).

In this instance, assume communication client 14C is configured not to create a new cookie, but instead update ICS Cookies A and B (step 140). Accordingly, the updated ICS Cookies A and B are sent to communication client 14B in an appropriate Session Response message (step 142). Communication client 14B may permanently or temporarily store the updated ICS Cookies A and B locally (step 144) as well as sending the updated ICS Cookies A and B to the registrar 22 in an appropriate Register message (step 146).

From the above, the ICS cookie may be created and sent to a remote communication client and then later retrieved in association with a subsequent interactive communication session. Upon retrieval, the ICS cookie can be used to control the interactive communication session or to provide other desired functions in light of the past interactions between the communication clients or associated entities or users. Further, the ICS cookies may be applicable to groups of communication clients (14A and 14B). The ICS cookies may be stored on a remote network entity, such as the registrar 22, and made available to the applicable communication clients (14A and 14B).

Figure 3:
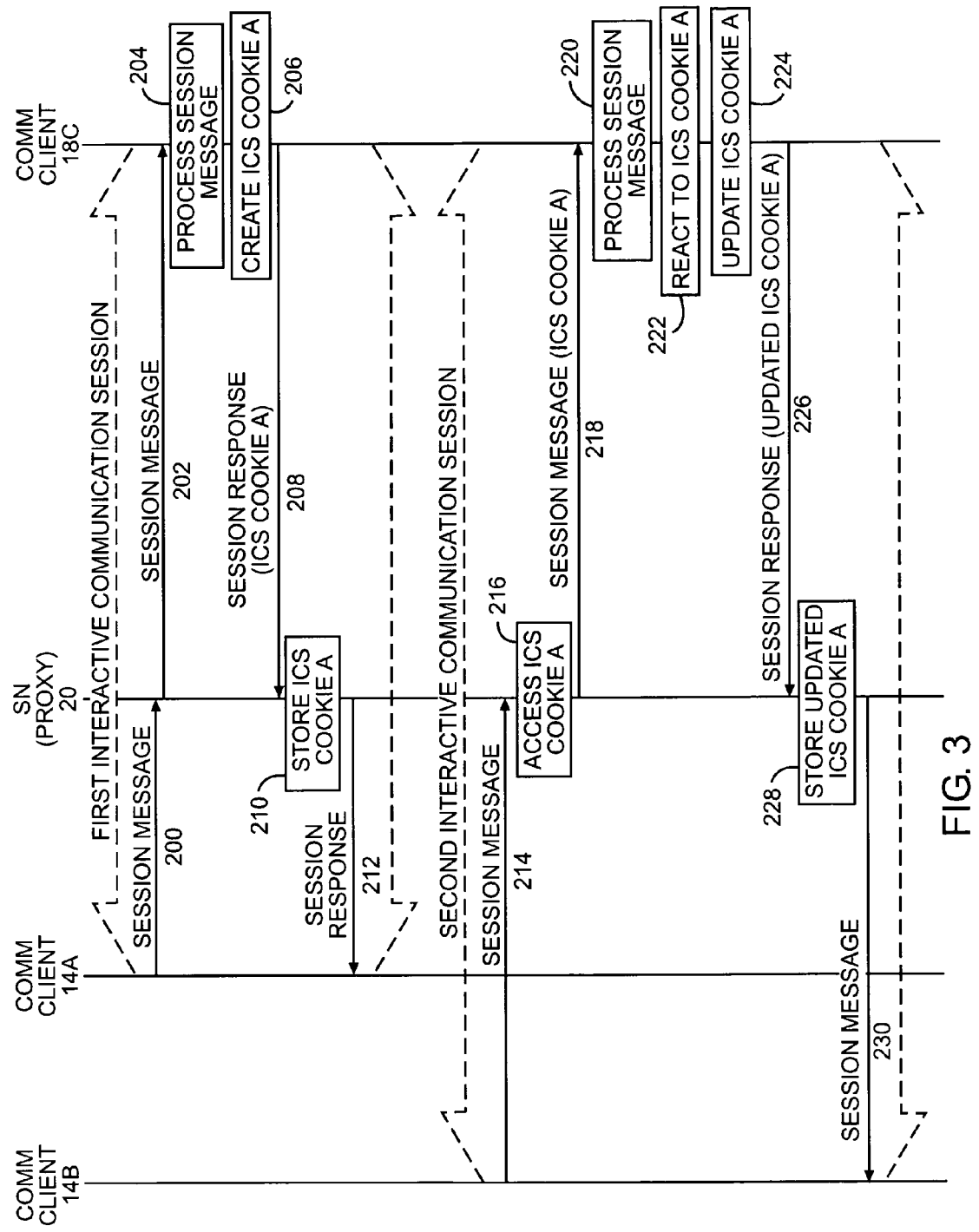

With reference to FIG. 3, a communication flow diagram is provided wherein the service node 20 acts as a proxy and takes a significant role in managing ICS cookies originally created and provided by a remote communication client 14C. The service node 20 will facilitate the sharing of those ICS cookies where sharing is appropriate. Those skilled in the art will recognize that certain ICS cookies may be specific to the particular communication client or pair of communication clients engaged in an interactive communication session.

In association with a first interactive communication session, assume communication client 14A sends a Session Message intended for communication client 14C. Since the service node 20 is acting as a proxy on behalf of communication clients 14A and 14B, communication client 14A will send the Session Message to service node 20 (step 200), which will forward the Session Message to communication client 14C (step 202). Communication client 14C will process the Session Message (step 204) and may create ICS Cookie A (step 206). ICS Cookie A is then sent in a Session Response toward communication client 14A. The Session Response will be received by the service node 20 (step 208), which will store ICS Cookie A (step 210) and forward the Session Response, either without ICS Cookie A (as shown) or with ICS Cookie A (as demonstrated in other scenarios herein), to communication client 14A (step 212).

Assume a second (subsequent) interactive communication session is established between communication clients 14B and 14C. In association with the second interactive communication session, communication client 14B may need to send a Session Message to communication client 14C. The Session Message is initially sent to the service node 20 (step 214), which will access an appropriate ICS Cookie (A) (step 216) and forward the Session Message, with ICS Cookie A, to communication client 14C (step 218). Communication client 14C will process the Session Message in traditional fashion (step 220) as well as reacting to the ICS Cookie A (step 222). Again, the reaction may be controlling the second interactive communication session or providing an additional function. In this instance, communication client 14C may be configured to update ICS Cookie A (step 224) and then send a Session Response message including the updated ICS Cookie A toward communication client 14B. The Session Response message will be received by the service node 20 on behalf of communication client 14A (step 226), wherein the service node 20 will store the updated ICS Cookie A (step 228). The service node 20 will then forward the Session Response message to communication client 14B (step 230). From the above, a network entity, such as a proxy, may be used to manage ICS cookies on behalf of a single communication client 14A or a group of communication clients 14A, 14B. In this instance, communication clients 14A and 14B do not need to be aware of the presence or availability of the ICS cookies.

The term "cookie creator" is used herein to refer to the entity that controls the creation and delivery of an ICS cookie. The term "cookie recipient" is used to refer to the entity that receives the ICS cookie from the cookie creator. As noted above, the cookie creator and cookie recipient may take many forms, and in particular the cookie recipient may be a proxy acting on behalf of an intended recipient. Equally, those skilled in the art will recognize that the cookie creator could also be a proxy acting on behalf of a client to control the creation and delivery of an ICS cookie. The cookie creator may be preconfigured to automatically create an ICS cookie and manage any associated ICS cookie information that is stored apart from but in association with the ICS cookie. The creation of an ICS cookie may be configured to involve user interaction. As such, the cookie creator may trigger a pop-up window or other user entry screen or other mechanism on a communication terminal 12 to provide the user with the ability to set preferences or establish privileges relating to a particular ICS cookie associated with a given user, a group of ICS cookies associated with a given user, or any number of ICS cookies associated with all or certain groups of users. Tremendous flexibility in configuring ICS cookies is available. Creation of a cookie may take place during an interactive communication session, when the interactive communication session is being established or ended, or after an interactive communication session. When an ICS cookie is created after an interactive communication session has been established, the cookie creator or a user associated with the cookie creator can confirm the identity of the cookie recipient before providing an appropriate ICS cookie, which may be associated with providing the cookie recipient privileges, authentication information, or the like.

The cookie creator can manage ICS cookies such that the content or privileges associated with the ICS cookie can be changed during an interactive communication session or when there is no interactive communication session. For example, the privileges associated with an ICS cookie provided during a first interactive communication session may be changed prior to a subsequent interactive communication session. Thus, privileges or information may be revised or revoked by changing settings at the cookie creator, such that when the ICS cookie is returned, the response by the cookie creator is modified appropriately.

The cookie creator may also predefine a number of ICS cookies that can be readily selected by a user and sent to cookie recipients as appropriate. For example, preset ICS cookies may be defined for important callers, family members, friends, or business contacts. In operation, the cookie creator could send an important voice session or cookie to a cookie recipient associated with a customer. The important voice session or cookie is intended to ensure that the customer can always reach the cookie creator. However, if the customer defaults on payment or is no longer considered an important customer, the cookie creator may store information indicating that the important voice session or cookie for the customer should be responded to differently or should no longer be recognized as a valid ICS cookie. As indicated above, the ICS cookies may be stored in different locations and be associated with different communication clients, which represent cookie recipients. Given the flexibility in handling ICS cookies, the present invention provides both client and location independence, if desired, for certain or all ICS cookies. For client independence, the user or group of users may access or use the same ICS cookies from any number of different communication clients of the same or different communication terminals. Accordingly, any number of applications running on these communication clients or communication terminals in general can access common ICS cookies. Location independence allows a particular user or group of users to access the same cookies from different locations, and in particular from different communication terminals 12.

There are countless ways in which ICS cookies can be used. The ICS cookie information that is stored in the ICS cookies or associated with a particular ICS cookie may include but is not limited to the following: shared encryption keys, passwords or other credentials, certificates or pointers to certificates, user account information or pointers to user account information, shared work space or application information, information bearing on the willingness to accept specific types of information or constraints, such as the willingness to be recorded in conjunction with an interactive communication session, information related to a prior interactive communication session with a specific entity, information useful in helping establish a subsequent interactive communication session, useful for sharing among multiple contemporaneous interactive communication sessions, or useful in conjunction with the current interactive communication session.

For authentication, the ICS cookie information may define authentication keys, encryption protocols, passwords, and the like that are used in an interactive communication session. By combining the use of ICS cookies for authentication and the ability to store ICS cookies in the communication network 10, any authentication process or encryption key exchange is made available to the user wherever the user is initiating the call, as long as access to the appropriate ICS cookie is provided.

The ICS cookies may also be useful in implementing network policies. The ICS cookie information may define which services are permitted to be used, such as instant messaging, multimedia calls, file sharing, or voice calls. The ICS cookie information may also bear on the relative level of trust between the respective communication clients. ICS cookies can play a major role in determining how disparate user communities federate with each other. Using the ICS cookie information to define policy information has the benefit that policy mechanisms are not required to be set up at both ends of the interactive communication session. The ICS cookie information may also play a role in actually routing interactive communication sessions. For example, the ICS cookie information may be used to define where an incoming call should be forwarded. The ICS cookie information may dictate whether an incoming interactive communication session for supporting voice communications is directed to the intended user's home telephone, cellular telephone, or voicemail. Further, the ICS cookie information is generally available at the initiation of an interactive communication session, and will enable personal criteria to be taken into consideration when the interactive communication session is being established and during the interactive communication session itself.

The use of ICS cookies is particularly beneficial in contact center applications and collaborative interactions. The ICS cookies can increase the efficiency of contact center interactions, especially when multiple interactions are involved. Pertinent information bearing on prior interactions can be recorded in the ICS cookie information and used for subsequent interactions. In addition, the ICS cookies can deliver user or resource credentials, as well as make shared information for collaboration readily available. The ICS cookie information may be used to find the most appropriate resource in situations where multiple agents are associated with the cookie creator. For example, if certain user agents are available for computer support and others are available for printer support, the ICS cookie information may indicate that the prior session related to computer issues, and as such, an interactive communication session should be directed to an agent capable of handling the computer issues, or the actual agent that assisted the user in the prior interactive communication session.

The ICS cookies may enable different policies to be implemented for different parties in a multi-party interactive communication session, such as a conference call. For example, all of the parties may be able to participate in the voice call, while only a subset of the parties can share files or participate in an instant messaging session associated with the conference call.

Further applications taking advantage of ICS cookies follow. The ICS cookie information may be used to allow a call center to automatically retrieve the caller's history and determine whether the current interactive communication session is a follow-up inquiry or a new inquiry. In this instance, an important customer might be given a priority cookie or have priority information associated with the ICS cookie information to allow the customer to be placed higher in the queue of callers or be routed to a certain agent or group of agents.

In multiple session environments or single session environments, including those relating to transactions, an unintentionally interrupted interactive communication session can be restarted and the ICS cookie information may be used to allow the new interactive communication session to resume and provide the cookie creator with sufficient information to resume the transaction where it was left off. In this vein, cookie creators could recognize returning or abandoned callers and retrieve information related to how long they were on hold. These callers could be given priority or be given credit for their previous wait periods.

The ICS cookie information may be used to establish any number of personal preferences for the cookie recipient, as well as store automation information to assist in initiating an interactive communication session or logging in to the system associated with the cookie creator. For example, login information for a voicemail system may be provided in the ICS cookie information. The ICS cookie information may be updated when repeated attempts to establish an interactive communication session with someone fail. The failed attempts may be tracked and updated in the ICS cookie information, wherein an appropriate response may be initiated from the cookie creator or the cookie recipient.

In one embodiment, the cookie recipient is able to populate the ICS cookie with certain information. For example, the cookie recipient may provide personal data associated with the cookie recipient in the ICS cookie. The personal data may include a name, address, customer account, financial account, credit card, debit card, or other types of information. Accordingly, when the ICS cookie is returned or provided to a particular entity by the cookie recipient, the information provided by the cookie recipient can be automatically retrieved and used in a secure and accurate fashion. Such an embodiment would allow the efficient checking of existing information and updating any information that has changed from one interactive communication session to another. In these embodiments, the ICS cookies may need to be encrypted or at least have certain of the ICS cookie information contained in the ICS cookies encrypted.

Figure 4:
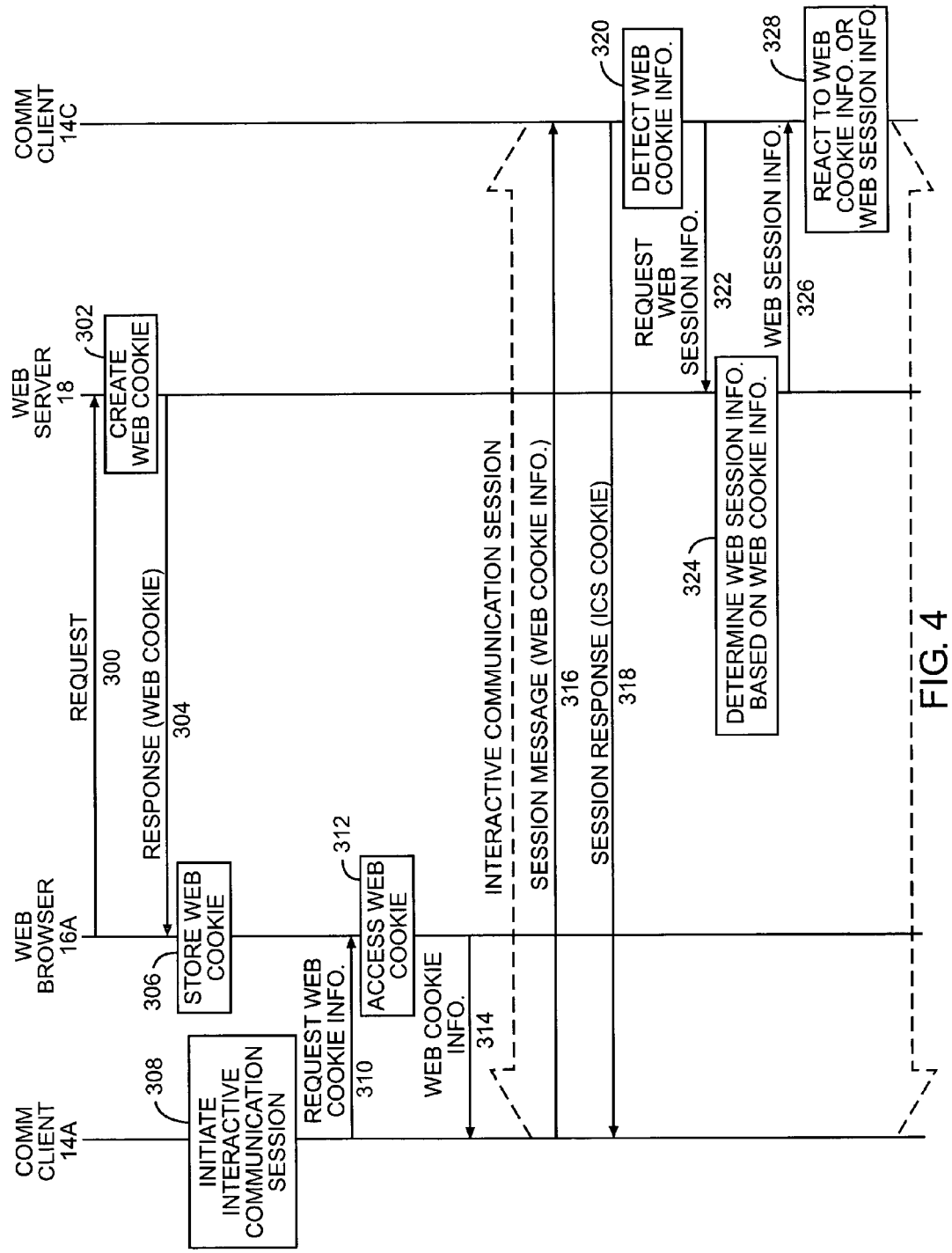
FIG. 4 is a communication flow diagram illustrating the use of web cookie information in association with an interactive communication session according to one embodiment of the present invention.

Another embodiment of the present invention is illustrated in the communication flow diagram of FIG. 4. In particular, web cookies, which are non-ICS cookies associated with a browser session, are subsequently obtained by communication client 14A and provided to a remote communication client 14C in association with an interactive communication session. Based on the web cookie information, communication client 14C may control the interactive communication session or provide appropriate functions. For example, communication client 14C may use the web cookie information to access information pertaining to a prior web session and use that web session information to control the interactive communication session or provide an appropriate function. Numerous examples of how the web cookie information can be used in association with an interactive communication session are provided below, after a review of the communication flow diagram of FIG. 4.

Initially, assume that web browser 16A of communication terminal 12A is engaged in a browsing session with the web server 18. During this browsing session, web browser 16A may send a Request for a defined web page to the web server 18 (step 300), which may create a web cookie (step 302) and send the requested page along with the web cookie to web browser 16A (step 304). The web cookie is a traditional web cookie, which is associated with a domain or web site provided by the web server 18. The web cookie will include a value or other information that can subsequently be used by the web server 18 to cater a web session for User X or at least for web browser 16A in traditional fashion. Although not depicted, web browser 16A would return the web cookie to the web server 18 during a subsequent session, wherein the web server 18 would respond in a particular manner based on the information in or associated with the web cookie. Once a web cookie is received by web browser 16A, the web cookie is generally stored in association with an identity of the user as reported by the operating system or web browser 16A itself (step 306).

For the current example, assume that communication client 14A is triggered to initiate an interactive communication session with communication client 14C, which is associated with User Y and the web server 18 (step 308). In this embodiment, communication client 14A is able to access the web cookies stored in association with web browser 16A. Communication client 14A may be able to identify web cookies that may be related to communication client 14C. In this instance, the web server 18 and communication terminal 12C, which supports communication client 14C, are associated. The name of the file for the web cookie may have a portion in common or associated with the uniform resource identifier or uniform resource locator (URL) of communication client 14C. Regardless of the configuration, communication client 14A will access web browser 16A or the location where web cookies are stored to obtain any web cookies that may be useful for an interactive communication session with communication client 14C.

In the illustrated embodiment, communication client 14A will send a Request for web cookie information to web browser 16A (step 310), which will access any appropriate web cookies (step 312) and provide the web cookie or web cookie information to communication client 14A (step 314). In association with the interactive communication session, communication client 14A will send a Session Message toward communication client 14C directly or indirectly through an appropriate proxy (step 316). The Session Message will include the web cookie information, which may be information within a web cookie or the web cookie itself. Communication client 14C may respond with a Session Response, which may, but does not have to, include an ICS cookie as described above (step 318). Communication client 14C will detect the web cookie information provided in the Session Message (step 320). Communication client 14C may then request web session information from the web server 18 based on the web cookie information (step 322). The web server 18 may determine the web session information based on the web cookie information (step 324) and provide the web session information back to communication client 14C (step 326). Communication client 14C would then react to the web cookie information or the web session information as desired to control the interactive communication session or provide an appropriate function related to the interactive communication session or the prior web session (step 328). In subsequent interactive communication sessions, an ICS cookie could be returned by communication client 14A to communication client 14C, wherein control of the interactive communication session or the provision of additional functions may be based on web cookie information, the web session information, the ICS cookie, or any combination thereof.

When sending web cookie information in association with an interactive communication session, those skilled in the art will recognize numerous situations in which this aspect of the present invention is beneficial. Assume that a user has been browsing various web pages to obtain travel information and subsequently decides to call the customer service center of the travel agency associated with the web site. During the web session, web browser 16A may have received a web cookie from the travel agency's web server. The travel agency's web server, in addition to providing the web cookie, may have kept track of the web pages that were browsed or any other particular information obtainable for the web session and store this information in association with the web cookie information provided in the web cookie. Upon initiating an interactive communication session with the travel agency, communication client 14A would access the web cookie and provide the web cookie information, which may include the web cookie itself or information inside the web cookie, to communication client 14C. Communication client 14C may use the web cookie information to access the stored information on the web server 18 associated with the travel agency. Accordingly, the customer service agent may be able to more quickly assist the caller.

A similar scenario uses the present invention to retrieve information regarding abandoned electronic shopping carts, wherein the user that abandoned the shopping cart subsequently calls a call center for the entity associated with the web site where the shopping cart was abandoned. Accordingly, the company or customer service agent can quickly determine that the caller has abandoned a shopping cart, and may be able to quickly and efficiently assist the customer and query the customer about the abandoned shopping cart or the items therein. Similarly, the user may have initiated a web session and may have begun filling out forms on a web page, and subsequently abandoned the attempt to fill out the forms upon running into an issue or not being able to provide certain of the requested information. With the present invention, the user may abandon the form partway through and initiate an interactive communication session with a customer service agent associated with the web site, wherein the customer service agent can retrieve the information that was provided before the user abandoned the form. Accordingly, the user would not have to repeat the information already provided on the web site during the interactive communication session.

Those skilled in the art will recognize additional extensions and applications of these aspects of the present invention. Notably, an ICS cookie may be provided during a web session and returned during a subsequent interactive communication session.

A corollary to the previous embodiment allows ICS cookie information to be provided during a web session. As such, information provided in the ICS cookie or associated therewith can be readily retrieved by the web server 18 during a web session. The ICS cookie information may have information bearing on user preferences, information discussed or exchanged during the interactive communication session, or like information that could assist a web server 18 in determining how to respond to requests provided by a web browser 16.

Figure 5:
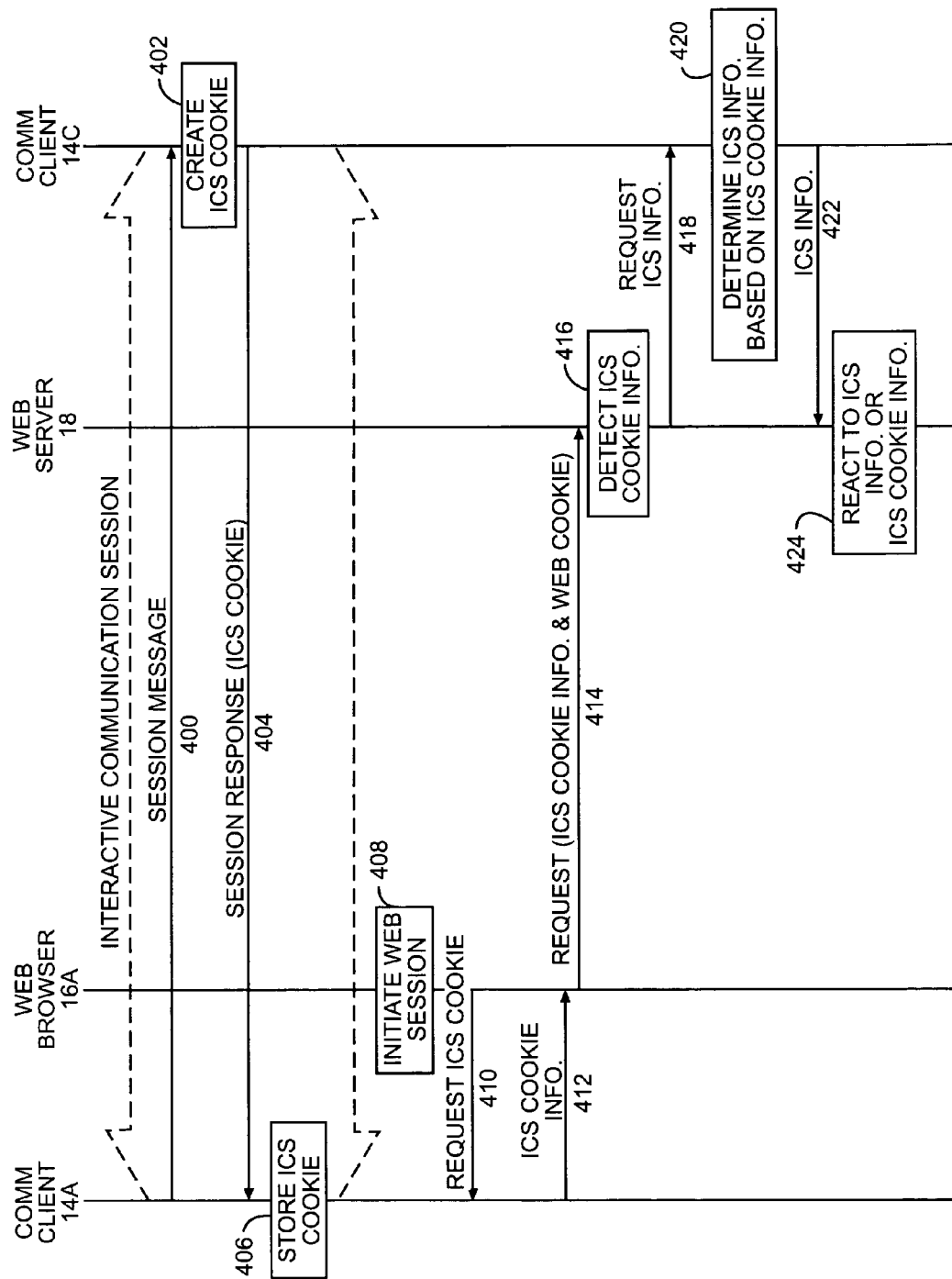
FIG. 5 is a communication flow diagram illustrating the use of interactive communication session cookie information in association with a web session according to one embodiment of the present invention.

Turning now to FIG. 5, a communication flow diagram is illustrated for an embodiment wherein ICS cookie information is provided to a web server 18 during a web session. In association with an interactive communication session, assume that communication client 14A sends a Session Message to communication client 14C (step 400), which creates an ICS cookie (step 402) and forwards the ICS cookie in a Session Response to communication client 14A (step 404). Communication client 14A will store the ICS cookie either locally or at the registrar 22 (step 406). Subsequently, User X will initiate a web session via web browser 16A (step 408), which may request or otherwise access ICS cookie information associated with communication client 14A (step 410). Communication client 14A will provide or otherwise make available ICS cookie information to web browser 16A (step 412). Web browser 16A, communication client 14A, or both web browser 16A and communication client 14A will be able to identify ICS cookies that may relate to the web session based on the name of the file storing the ICS cookie or the contents of the ICS cookie.

Web browser 16A may then send a Request to the web server 18 for a given web page (step 414). The Request may include the ICS cookie information, which may include information in the ICS cookie or the ICS cookie itself, as well as any existing web cookie associated with the web page being requested. The web server 18 will detect the presence of the ICS cookie information (step 416) and then access any related ICS information based on the ICS cookie information from communication client 14C or from an associated entity (not shown), such as a business application server that may have access to this information. For example, the web server 18 may send a request for the ICS information to communication client 14C (step 418), which will determine the ICS information based on the ICS cookie information (step 420) and provide the ICS information back to the web server 18 (step 422). The web server 18 will then react to the ICS information or the ICS cookie information (step 424). The web server 18 may also take into consideration any web cookies. Functionality based on the web cookie, the ICS cookie information, or the ICS information may be used to control the web session in much the same fashion as a web cookie may be used to control a web session. The availability of the ICS information or the ICS cookie information allows for taking into consideration additional criteria related to a prior interactive communication session to control the web session, instead of merely using information related to prior web sessions. Further, the web server 18 may be able to directly evaluate the ICS cookie and take certain actions.

Figure 6:
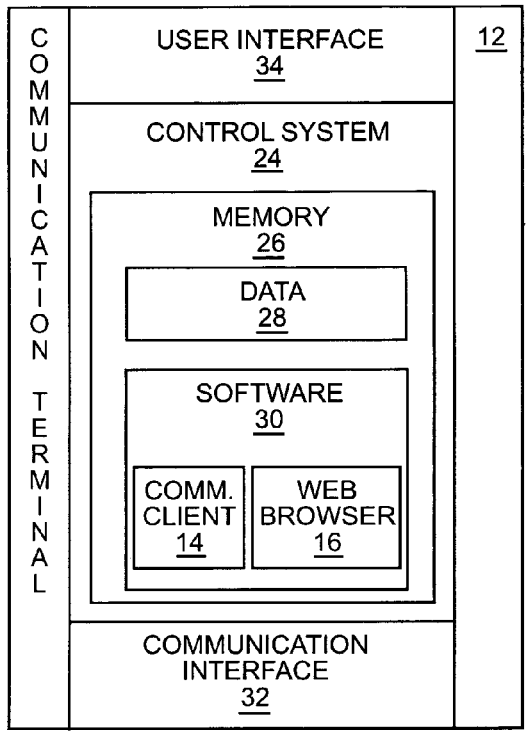
FIG. 6 is a block representation of a communication terminal according to one embodiment of the present invention.

With reference to FIG. 6, a basic communication terminal 12 is illustrated. The communication terminal 12 may include a control system 24 having sufficient memory 26 for the requisite data 28 and software 30 to operate as described above. The software 30 may be used to implement the communication client 14 or web browser 16 and control the operation thereof as described above. The control system 24 may be associated with a communication interface 32 to facilitate communications directly or indirectly with the communication network 10, as well as a user interface 34 to facilitate interactions with the corresponding user.

Figure 7:
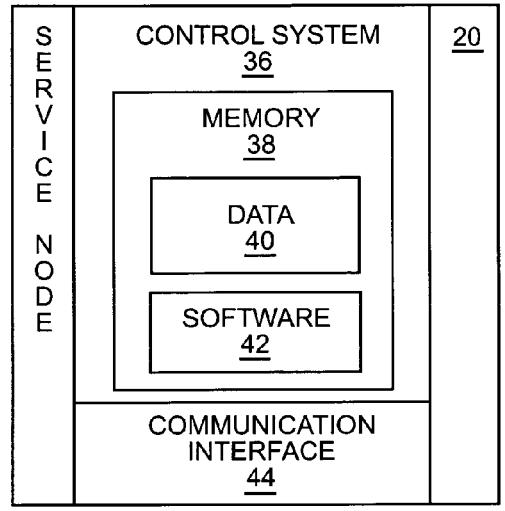
FIG. 7 is a block representation of a service node according to one embodiment of the present invention.

With reference to FIG. 7, a service node 20 is illustrated as having a control system 36 associated with memory 38. The memory 38 will include the data 40 and software 42 necessary to operate as described above. The control system 36 is further associated with a communication interface 44 to facilitate interaction with the communication network 10.

Figure 8:
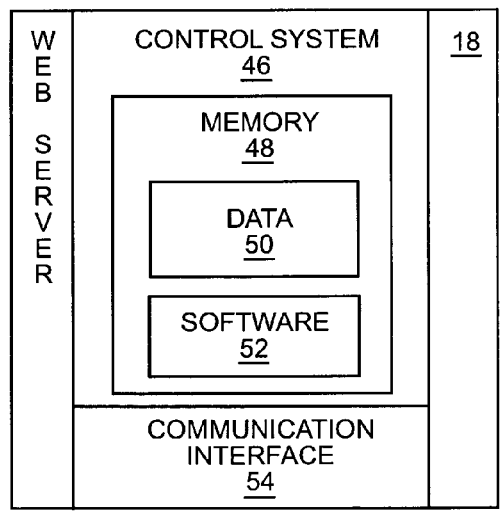
FIG. 8 is a block representation of a web server according to one embodiment of the present invention.

With reference to FIG. 8, a web server 18 is illustrated as having a control system 46 associated with memory 48. The memory 48 will include the data 50 and software 52 necessary to operate as described above. The control system 46 is further associated with a communication interface 54 to facilitate interaction with the communication network 10.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   accessing an interactive communication session (ICS) cookie received in association with an interactive real-time communication session between first and second communication clients, the ICS cookie associated with ICS cookie information, wherein the ICS cookie provides persistent information relating to the interactive real-time communication session and the ICS cookie is a cookie other than a web cookie;
   providing to a web server one of the ICS cookie information and the ICS cookie in association with a web session; and
   simultaneously providing to the web server a web cookie associated with a web page of the web session when providing one of the ICS cookie information and the ICS cookie, wherein the web server is adapted to use both the ICS cookie information and the web cookie.

2. The method of claim 1 further comprising requesting and receiving web pages from the web server to provide to the web session.

3. The method of claim 1 further comprising establishing the interactive real-time communication session with a remote communication terminal.

4. The method of claim 1 further comprising:
   receiving from the web server a second web cookie; and
   sending the second web cookie to the web server in association with a second web session.

5. A method comprising:
   receiving from a remote web browser one of an interactive communication session (ICS) cookie and ICS cookie information contained in the ICS cookie in association with a web session, the ICS cookie received by a remote communication terminal associated with the remote web browser during an interactive real-time communication session between first and second communication clients, wherein the ICS cookie provides persistent information relating to the interactive real-time communication session and the ICS cookie is a cookie other than a web cookie;
   simultaneously receiving from the remote web browser a web cookie associated with a web page of the web session when receiving one of the interactive communication session (ICS) cookie and ICS cookie information contained in the ICS cookie; and
   controlling the web session based on either the ICS cookie or the ICS cookie information and the web cookie.

6. The method of claim 5 further comprising accessing persistent session information associated with the interactive real-time communication session based on either the ICS cookie or the ICS cookie information.

7. The method of claim 5 further comprising providing a function based on the ICS cookie or the ICS cookie information.

8. The method of claim 6 wherein the persistent session information is accessed from a local communication terminal, which provided the ICS cookie to the remote communication terminal.

9. The method of claim 5 further comprising:
   creating a second web cookie bearing on the web session;
   sending the second web cookie to the remote communication terminal in association with the web session; and
   receiving the second web cookie from the remote communication terminal in association with another interactive real-time communication session.

* * * * *